Figure 1:
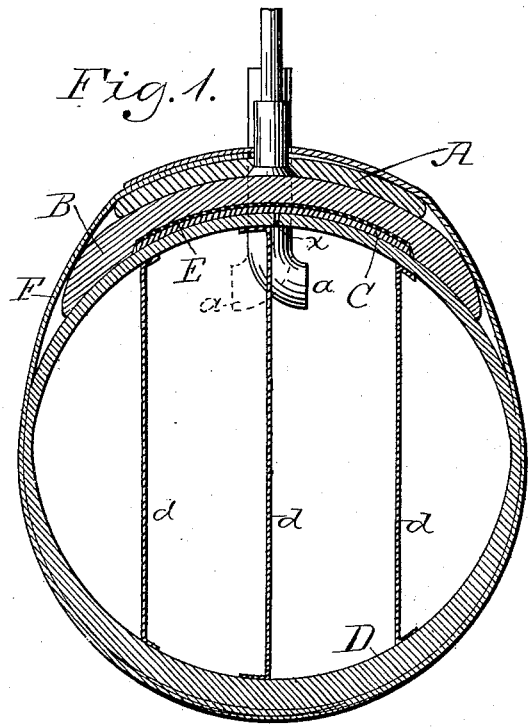

(No Model.)

G. W. DORR.
BICYCLE WHEEL TIRE.

No. 469,516. Patented Feb. 23, 1892.

Witnesses:
Robert R. Pryor
James Springer

Inventor:
George W. Dorr
By Frank D. Thomason
Atty

UNITED STATES PATENT OFFICE.

GEORGE WASHINGTON DORR, OF CHICAGO, ILLINOIS.

BICYCLE-WHEEL TIRE.

SPECIFICATION forming part of Letters Patent No. 469,516, dated February 23, 1892.

Application filed October 6, 1891. Serial No. 407,361. (No model.)

*To all whom it may concern:*

Be it known that I, GEORGE WASHINGTON DORR, of Chicago, Cook county, Illinois, have invented certain new and useful Improvements in Bicycle-Wheel Tires, of which the following is a full, clear, and exact description, reference being had to the accompanying drawings, and to the letters of reference marked thereon.

The object of my invention is to provide a pneumatic tire, the inflated tube of which is divided longitudinally into separate air chambers or compartments, so that there will not be a complete collapsing of the tire when the same is punctured, and which is otherwise so constructed as to prevent the tube being injured by the rim of the wheel, especially when the inflating medium in the tube has become more or less exhausted therefrom, substantially as hereinafter fully described, and as illustrated in the drawings, in which—

Figure 2:
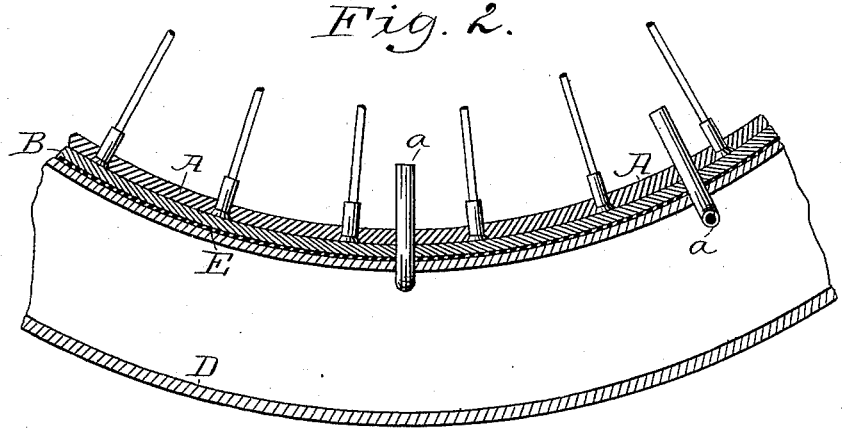

Figure 1 shows a transverse vertical section through my improved tire, and Fig. 2 shows a longitudinal section therethrough.

In the drawings, A represents the rim of my improved tire, the outer periphery of which is slightly concave and has seated and suitably secured therein the annular pad B. This pad is slightly thicker than the rim of the wheel, and is of such width that its side edges extend an equal distance beyond the side edges of the rim A.

D represents a rubber tube, which is divided into several air compartments or chambers by the vertical diaphragms $d$. In the drawings I show but three of these diaphragms, one of which is located so as to intersect the center of said tube, and each of the others of which are located an equal distance from said central diaphragm.

In order to facilitate the manufacture of the tube as thus constructed, I slit the inner circumference of the same longitudinally, substantially as shown at $x$ in the drawings. This enable me to cement or otherwise suitably secure the side diaphragms so that their ends will connect the ends of the said segment of the tube, and when this is done to secure the central diaphragm in place, substantially as shown. After the diaphragms have been secured in place in the bore of the tube, I close up said slit by sealing it or otherwise uniting the butt edges. I prefer to seal it up, however, by cementing over the inner circumference of the tube with a suitable cement a flat elastic band C, and then cementing over said band a non-elastic strip E of canvas, linen, or other suitable fabric, which effectually prevents the band from stretching when the tube is inflated, and yet permits access to the bore of said tube when the same is punctured, in substantially the same manner as now used in the Dunlop tire, hereinafter referred to. This tube is provided with as many inlet-valves $a$ $a$ as there are separate air chambers or compartments, and the said tube is seated in the concave periphery of the pad B, and is held in place not only by the fact that the radius of its inner circumference is less than the radius of the side edges of the pad, but because of an envelope F of canvas or other suitable material, which surrounds the outer circumference of the tube and laps up over the side edges of the pad and the inner circumference of the rim. The edges of this envelope are slit laterally, so as to permit them to lap past the spokes of the wheel, and so that, preferably, one of said edges lap over the other. Said envelope may be cemented to the said outer circumference of tube; but I prefer to mold it therewith, so as to make it intermesh with the rubber and obtain a secure hold thereon. This envelope secures the tube in place by having its side edges lapped over and secured to the inner circumference of the rim, and, besides, affords a flexible armor for the same, which renders the tube more difficult to puncture. Should the tube become punctured, it is apparent that only the particular chamber in said tube effected by said puncture would collapse, and that the expansive property of the compressed air in the adjacent chamber or chambers would cause the diaphragm to swell or bulge out into the collapsed chamber, and thus practically render the tube as good for riding purposes as it was originally. This is particularly the case when an additional quantity of air is pumped into the unaffected chambers. It is rightfully thought that when any of said chambers collapse the tube would be softer than when all of said chambers were air-tight, and thus cause the tube to flatten under the weight of the rider. Right here it might be well to observe that the pad renders material assistance in preventing the tube from being cut or otherwise affected by the metal rim of the wheel in the manner that it is possible for the tube of the "Dunlop pneumatic tire" as now constructed to do.

The pad B is a very important feature of my invention and is made, preferably, of elastic material. Said pad not only acts as a cushion to prevent the abrasion and cutting of the pneumatic tube by the edge of the metallic rim, but also extends a considerable distance beyond said rim in the manner shown, and forms a yielding support for the sides of the tube. I also prefer that the diaphragm used in my tube should be of elastic material, although this is not absolutely necessary provided they are air-tight.

I do not wish to be considered herein as claiming, broadly, the vertical diaphragms in the tube D, as such vertical diaphragms are shown in an application for Letters Patent of the United States filed by me on the 20th day of July, 1891, and numbered 400,115, to which this application, so far as it relates to "vertical diaphragms," is subordinate.

What I claim as new is—

1. A pneumatic tire for vehicle-wheels, consisting of an inflated tube divided longitudinally into air-chambers by means of elastic vertical central and side diaphragms.

2. A pneumatic tire for vehicle-wheels, consisting of an inflated tube divided longitudinally into air-chambers and having its inner portions next the rim provided with a longitudinal slit, which is suitably sealed.

3. A pneumatic tire for vehicle-wheels, consisting of an inflated tube divided longitudinally into air-chambers by means of vertical central and side diaphragms, and provided with a longitudinal slit in its inner portions next the rim suitably sealed.

4. A pneumatic tire for vehicles, consisting of a metallic rim and an integral pad resting in and entirely covering the outer periphery thereof, the side edges of which extend in transverse circumferential alignment beyond the side edges of said rim, so as to lap against and support the adjacent side walls of an inflatable tube placed and held in the outer concave periphery of said pad and said inflatable tube, as set forth.

5. A pneumatic tire for vehicles, consisting of a metallic rim and an integral pad resting in and covering the outer periphery thereof, the side edges of which extend in transverse circumferential alignment beyond the side edges of said rim, so as to lap against and support the adjacent side walls of an inflatable tube placed and held in the outer concave periphery of said pad, said inflated tube, and an envelope suitably secured to said rim.

6. A pneumatic tire for vehicles, consisting of a metallic rim, a pad in the outer periphery thereof, and an inflated tube secured to the periphery of said pad and divided into several longitudinal air-chambers by vertical longitudinal diaphragms, as set forth.

7. The combination, with the metallic rim and a pad secured to the outer periphery thereof, of the inflated tube, the inner circumference of which is provided with a longitudinal slit properly sealed, which is divided into longitudinal air-chambers by longitudinally-disposed diaphragms, and an envelope of suitable fabric inclosing said tube and pad and having its side edges secured to said rim, as set forth.

8. The combination, with the metallic rim and a pad surrounding and secured to the outer periphery thereof, of an inflated tube, the inner circumference of which is provided with a longitudinal slit, longitudinally-disposed diaphragms for dividing the bore of said tube into longitudinal air-chambers, a band covering and secured to the inner circumference of said tube, so as to thoroughly close said slit, and an envelope of suitable fabric surrounding and closing said tube, pad, and rim and having its side edges lap over and suitably secured to the inner circumference of said rim, as set forth.

GEORGE WASHINGTON DORR.

Witnesses:
A. A. HALL,
F. D. THOMASON.